UNITED STATES PATENT OFFICE.

ALFRED R. POTTER, OF PHILADELPHIA, PENNSYLVANIA.

PROCESS OF SALTING PEANUTS.

SPECIFICATION forming part of Letters Patent No. 713,918, dated November 18, 1902.

Application filed February 25, 1902. Serial No. 95,624. (No specimens.)

*To all whom it may concern:*

Be it known that I, ALFRED R. POTTER, a citizen of the United States, residing in the city and county of Philadelphia, State of Pennsylvania, have invented a new and useful Process of Salting Peanuts, of which the following is a specification.

My invention consists of a novel process or method of salting nuts, embodying the treatment of the same with salt while in the shell.

In carrying out my invention I place nuts in raw condition in water to which salt has been or is added and boil them so that they are subject to the action of the salt permeating the shells. When the boiling has been sufficiently accomplished, the nuts are removed from the water and dried and roasted while in the shell.

It will be seen that the meat or nuts proper, though salted, remain shelled, and so may be transported, &c., without exposure to air or contact with the hands, dirt, &c., and the covering skins will be intact, preserving the original condition of the nut and the apparent fresh and salable appearance of the same, as evident, when opened. In other words, while the salting of the nut has been effected the protective nature of the exterior shells and inner skins are undisturbed until the necessary breaking of the shells.

Having thus described my invention, what I claim as new, and desire to secure by Letters Patent, is—

1. The method of treating a nut, the same consisting in boiling the nut while in its shell in salt water, and roasting the unshelled nut as thus boiled.

2. The method of treating a nut, the same consisting in boiling the nut while in its shell in salt water, and then drying and roasting the unshelled nut as thus boiled.

ALFRED R. POTTER.

Witnesses:
JOHN A. WIEDERSHEIM,
C. D. McVAY.